US009560091B2

(12) United States Patent
Kass et al.

(10) Patent No.: US 9,560,091 B2
(45) Date of Patent: Jan. 31, 2017

(54) ACTION ORIENTED SOCIAL COLLABORATION SYSTEM

(71) Applicant: Accenture Global Services Limited, Dublin (IE)

(72) Inventors: Alex Kass, Palo Alto, CA (US); Sunil Shettigar, Sunnyvale, CA (US); Srinivas Yelisetty, Freemont, CA (US); Maria P. Ergueta, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 140 days.

(21) Appl. No.: 14/015,370

(22) Filed: Aug. 30, 2013

(65) Prior Publication Data

US 2014/0082525 A1  Mar. 20, 2014

Related U.S. Application Data

(60) Provisional application No. 61/702,216, filed on Sep. 17, 2012, provisional application No. 61/768,146, filed on Feb. 22, 2013.

(51) Int. Cl.
*H04L 29/06* (2006.01)
*G06Q 50/00* (2012.01)
*G06Q 10/10* (2012.01)

(52) U.S. Cl.
CPC ........... *H04L 65/403* (2013.01); *G06Q 10/101* (2013.01); *G06Q 50/01* (2013.01)

(58) Field of Classification Search
CPC ...... G06Q 10/00; G06Q 50/01; G06Q 10/101; H04L 65/403
See application file for complete search history.

(56) References Cited

U.S. PATENT DOCUMENTS 6,065,009 A   5/2000 Leymann et al.
7,526,459 B2  4/2009 Flinn et al.
(Continued)

FOREIGN PATENT DOCUMENTS

EP  1619618 A1  11/2011
EP  2463814 A1  6/2012
(Continued)

OTHER PUBLICATIONS

Salesforce.com Unveils Salesforce Chatter—Enterprise Collaboration Meets the Real-Time Social Computing Model Loved by Millions on Facebook and Twitter—http://www.prnewswire.com/news-releases/salesforcecom-unveils-salesforce-chatter---enterprise-collaboration-meets-the-real-time-social-computing-model-loved-by-millions-on-facebook-and-twitter-70374242.html, dated Jan. 22, 2013, (4p).

(Continued)

*Primary Examiner* — Amy Ng
*Assistant Examiner* — Tan Tran
(74) *Attorney, Agent, or Firm* — Brinks Gilson & Lione

(57) ABSTRACT

An action oriented social collaboration system monitors users' interactions with computer software applications. The system provides the interactions to a social networking system. The system publishes the interactions data to a social networking/collaboration interface viewable by members of a group, such as a project team. The system not only publishes data corresponding to a user's interactions with the computer software application, but also publishes the user's interactions with the computer software application to interfaces corresponding to other project team members as well.

20 Claims, 16 Drawing Sheets

(56) References Cited

U.S. PATENT DOCUMENTS

| | | | |
|---|---|---|---|
| 7,895,209 B2 | 2/2011 | Spence et al. | |
| 8,145,678 B2 | 3/2012 | Ramsay, Jr. et al. | |
| 8,301,477 B2 | 10/2012 | Allam et al. | |
| 8,768,751 B2 | 7/2014 | Jakowski et al. | |
| 8,768,764 B1 | 7/2014 | Paharia | |
| 2002/0023176 A1 | 2/2002 | Kwicinski | |
| 2002/0157017 A1 | 10/2002 | Mi et al. | |
| 2003/0061330 A1 | 3/2003 | Frisco et al. | |
| 2003/0078874 A1 | 4/2003 | Cope | |
| 2003/0090514 A1 | 5/2003 | Cole et al. | |
| 2004/0143477 A1 | 7/2004 | Wolff | |
| 2004/0183829 A1 | 9/2004 | Kontny et al. | |
| 2004/0186762 A1 | 9/2004 | Beaven et al. | |
| 2005/0027585 A1 | 2/2005 | Wodtke et al. | |
| 2005/0095569 A1 | 5/2005 | Franklin | |
| 2005/0257158 A1* | 11/2005 | Lombardo | G06F 17/2288 715/751 |
| 2006/0195778 A1 | 8/2006 | Bendik | |
| 2007/0100875 A1 | 5/2007 | Chi et al. | |
| 2007/0124185 A1 | 5/2007 | Elkin et al. | |
| 2007/0162324 A1 | 7/2007 | Suzuki et al. | |
| 2007/0162907 A1 | 7/2007 | Herlocker et al. | |
| 2007/0276714 A1 | 11/2007 | Beringer | |
| 2008/0004927 A1 | 1/2008 | Haller et al. | |
| 2008/0091496 A1 | 4/2008 | Gurpinar et al. | |
| 2008/0109244 A1 | 5/2008 | Gupta | |
| 2008/0127041 A1 | 5/2008 | Gura | |
| 2008/0155425 A1* | 6/2008 | Murthy | G06F 9/4443 715/738 |
| 2008/0183538 A1 | 7/2008 | Hamadi et al. | |
| 2008/0228774 A1 | 9/2008 | Hamilton et al. | |
| 2008/0229213 A1 | 9/2008 | Hamilton et al. | |
| 2008/0229214 A1* | 9/2008 | Hamilton | H04L 67/22 715/751 |
| 2008/0312992 A1 | 12/2008 | Hoshi et al. | |
| 2009/0112655 A1 | 4/2009 | Stuhec et al. | |
| 2009/0138257 A1 | 5/2009 | Verma et al. | |
| 2010/0057682 A1* | 3/2010 | Ramsay, Jr. | G06Q 10/10 707/E17.014 |
| 2010/0121859 A1 | 5/2010 | Maeda et al. | |
| 2010/0262557 A1 | 10/2010 | Ferreira et al. | |
| 2011/0137702 A1 | 6/2011 | Hodges et al. | |
| 2011/0179045 A1 | 7/2011 | Caldwell et al. | |
| 2011/0288897 A1 | 11/2011 | Erhart et al. | |
| 2012/0192064 A1* | 7/2012 | Antebi | G06Q 10/10 715/255 |
| 2012/0215705 A1 | 8/2012 | Porro et al. | |
| 2012/0216125 A1 | 8/2012 | Pierce | |
| 2013/0073280 A1 | 3/2013 | O'Neil et al. | |
| 2013/0073343 A1 | 3/2013 | Richardson et al. | |
| 2014/0025441 A1 | 1/2014 | Eberlein et al. | |

FOREIGN PATENT DOCUMENTS

| | | |
|---|---|---|
| EP | 1699009 A1 | 8/2012 |
| WO | WO2009/023984 A1 | 2/2009 |

OTHER PUBLICATIONS

LeFebvre, Richard, "Online Media Daily: Oracle Takes Social Marketing Seriously", Oracle CRM EMA Partner Community, Nov. 19, 2012, (1p).

Oracle Social Network—An Oracle White Paper, Oct. 2011. http://www.oracle.com/technetwork/middleware/webcenter/socialnetwork/overview/wp-oracle-social-network-2011-513258.pdf, (18p).

Salesforce Radian6—Insights—Social Media is a Big Data—http://www.radian6.com/what-we-sell/marketingcloud/analysis-insights/, Jan. 22, 2013, (1p).

Salesforce Radian6—Engagement Console—Engagement Console, http://www.radian6.com/what-we-sell/marketingcloud/analysis-insights/, Jan. 22, 2013, (4p).

Salesforce Radian6—Workflow and Automation—http://www.radian6.com/what-we-sell/marketingcloud/analysis-insights/, Jan. 22, 2013, (2p).

Social Ads—Amplify your content, Jan. 22, 2013, (1p).

Salesforce Social Hub—Transform Your Business into a Socially Connected Enterprise, Jan. 22, 2013, (2p).

Data Super Friends: Can Social Medial and Enterprise Applications Team Up?—http://webcachegoogleusercontent.com/search?q=cache:6OyJ4dxjL6YJ:http://gigaom . . . , dated Jan. 22, 2013, (8p).

OfficeXta—Social Enterprise Collaboration Platform—https://www.officexta.com/tag/features/do?p=1, dated Jan. 22, 2013, (2p).

SnapLogic—Social Media Integration: Cloud Data Integration Tools & Solutions—http://www.snaplogic.com/what-we-do/solutions/social-media-integration.php, dated Jan. 22, 2013, (1p).

SocialCast—Enterprise Social Networking, Enterprise Collaboration—http://www.socialcast.com/product, dated Jan. 22, 2013, (3p).

SocialCast—Integrat Business Applications with Enterprise Social—http://www.socialcast.com/social-network-integration, dated Jan. 22, 2013, (2p).

Social Cast—Enterprise Social Networking Software & Activity Stream—http://www.socialcast.com/enterprise-social-network, dated Jan. 22, 2013, (2p).

SAP Social Software—Video: Social Learning with SAP Jam and SuccessFactors Learning Management System by David Brockington (Dec. 12, 2012)—http://scn.sap.com/community/socialsoftware/blog, dated Jan. 22, 2013, (14p).

Social Media Analysis Software—CRM Software—SAP—Make Social Media Platforms an Asset to Your Organization With Our Social Media Analysis Software—http://www54.sap.com/lob/customer-service/software/social-media-analytics/index.html, dated Jan. 22, 2013, (1p).

Facebook for the Enterprise—http://www.appirio.com/products/facebookconnect.php, dated Jan. 22, 2013, (1p).

Appirio Helps Businesspeople Connect the Facebook Platform to Salesforce CRM—http://press.appirio.com/2008/10/appino-helps-businesspeople-connect.html, dated Jan. 22, 2013, (2p).

Yammer: What is Yammer—The First and Most Powerful Enterprise Social Network—https://www.yammer.com/product/, dated Jan. 22, 2013 (2p).

Yammer: Yammer Platform—What is Yammer—Integrate Your Business Applications—https://www.yammer.com/product/features/yammer-platform/, dated Jan. 22, 2013, (3p).

Gamification 101: An Introduction to the Use of Game Dynamics to Influence Behavior, White Paper BUNCHBALL Inc,, Oct. 2010, retrieved online on Mar. 18, 2015 from http://bunchball.com/sites/default/files/downloads/gamification101.pdf, 14 pages.

European Search Report for EP Application No. 11183845.4 dated Dec. 30, 2011 (7p).

Office Action for U.S. Appl. No. 12/537,830 dated Mar. 21, 2012 (15p).

Office Action for U.S. Appl. No. 12/537,830 dated Aug. 28, 2012 (16p).

First Examiner's Report for Australian Application No. 2010206022, dated Mar. 30, 2011 (3p.).

Korba et al., "Automated social network analysis for collaborative work." (2006). 10 pages.

Wellman, "Computer networks as social networks." Science 293. 5537 (2001): 2031-2034.

Fisher et al., "Social and Tempural structures in everyday collaboration." Proceedings of the SIGCHI conference on Human factors in computing systems. ACM, 2004. 8 pages.

Dutra et al., "Using an Inference Engine to Detect Conflicts in Collaborative Design." 14th International Conference on Concurrent Enterprising (ICE 2008)—Lisbon, Portugal, 2008. 8 pages.

Office Action issued in corresponding Australian patent application No. 2015203351 on Apr. 21, 2016, 4 pages.

* cited by examiner

◇ Activity Inbox Alerts People Places Content Apps /Create     ◎ Search

Action Oriented Collaborative Workspace

/Overview\ Content People Projects Reports     ✱ Manage ▼

Action Panel _302_

| Action | Type |
|---|---|
| Announce an Accomplishment | Customer Kudos ǀ Stretch Goals ǀ Thought Leadership ǀ Public Speaking ǀ Intellectual Property ǀ Misc ǀ |
| Meeting Notes | Team Meeting ǀ Partner Meeting ǀ External Meeting ǀ |
| Create a Project | Regular Project ǀ |
| Start a Discussion | About a Client ǀ About an Asset ǀ About about News ǀ Other |
| Create a Dossier | Client Dossier ǀ Vendor Dossier ǀ Other Dossier |
| Create a Document | Project Planning ǀ Project Description ǀ Thought Leadership ǀ Demo or Demo Script ǀ |

Activity stream for social collaboration group space _306_

Mar 26, 2012 6:45 PM
Jane Doe replied to discussion: "Re"

Mar 28, 2012 6:43 PM
Jane Doe replied to discussion: "Training selection in 'ACN_Proposal_v6.docx'."

Mar 28, 2012 6:43 PM
Jane Doe started discussion: "Tracking initiated for 'ACN_Proposal_.'"

Mar 28, 2012 4:19 PM
Jane Smith replied to discussion: "Re Feed reader 6"

Mar 28, 2012 4:16 PM
Jane Smith started discussion: "Augmentation 5"

Create a Sales Opportunity _304_

Opportunity Name [ ]
Industry Tags [ ]
Technology Tags [ ]
[Create]

Document by Type And Maturity Stage _308_

From [Outlined ▼] to [Completed ▼]

■ Use Care for Community Saving Dependent work
Status: Completed ǀ April 11,2012

■ Social-Collaboration Technology Changes the Relationship
Astxxs, Edison, and Aadesce
Dates: Revised ǀ Mar 27, 2012

■ Used as Enterprise Persuasive Game Engine in Stage Collaborative Betaxxx
Status: Outlined ǀ June 5, 2012

_310_

Task Overview Panel _312_

[All Task Categories ▼] [All Task Owners ▼]

☐ Overdue: reestablish meetings with Tim Social Collaboration with Ava ǀ John Doe ǀ Feb 16
☐ Overdue: Review Program Overview AScot Detail Pages RSC Misc tasks and checkpoints ǀ John Doe ǀ Feb 14
☐ Overdue: Review Program Overview Showcase RSC Misc tasks and checkpoints ǀ John Doe ǀ Feb 14
☐ Overdue: Review iP strategy and start planning RSC Misc tasks and checkpoints ǀ John Doe ǀ Feb 15
☐ review blog http://accenture-ie.hosted jivesoftware.com/docs/DOC-1784 Ramification Blog Post ǀ Test User ǀ Apr10

Intellectual Property Project _316_

Project Name [ ]
Industry Type [ ]
Asset Type [ ]
[Create]

Activity Inbox Alerts People Places Content Apps / Create   Search

Selective SoCo Activity Stream

Overview  Content  People  Projects  Reports

- Stream filtered to provide relevant content to avoid the clutter
- Each updated re-formatted and enhanced with links to related projects and documents
- Each link automatically connected to the appropriate resource (document or task)

Activity stream for social collaboration group space    ✱ Manage ▼    318

Jan 11, 2012 12:31 PM
John Doe completed the admin task: "have the meeting actions have different tags"

Jan 10, 2012 10:41 PM
Jane Doe updated the programming task: "Task Widget – Update 1"

Jan 10, 2012 4:08 PM
John Doe created a document: "Utility SAP Innovation Proposal"

Jan 10, 2012 4:05 PM
Jane Smith updated the project-planning document: "jive data future application"

Jan 10, 2012 4:04 PM
Jane Smith made a comment: "these are the slides that I share preliminary results. I'm going to talk…[+]"

Jan 10, 2012 3:41 PM
John Doe updated the task: "Create first draft of requirements section for Big Utility Client propo…[+]"

Jan 10, 2012 3:39 PM
John Doe created a task: "Create first draft of requirements section for Big Utility Client propos …[+]"

Jan 10, 2012 11:28 AM
John Doe created a thought-leadership document: "Enterprise Social Collaboration Division"

Jan 10, 2012 10:34 AM
John Smith updated the external-meeting document: "Meeting about PARC and jive"

◊ Activity Inbox Alerts People Places Content Apps /Create   🔍Search

Pending Actions Overview Panel

/Overview\ Content People Projects Reports                    ✦Manage▼

• Review tasks by assignee, due date, and project that are linked to appropriate content Open Tasks ▼                                              312

All Task Categories ▼ | All Task Owners ▼
All Task Categories
acn-meeting           get topic observe in jive
demo                  technology to Promote Peripheral Awareness for Adjacent Teams | John
external-meeting
team-meeting
thought-leadership ▦ Overdue: reestablished meetings Tim
  Social Collaboration with jive | John Smith | Jan 14
▦ Overdue: Review IP strategy and start planning
  ESC Misc tasks and checkpoints | John Smith | Jan 14
▦ Task Widget - Update 1
  Next-Gen ESCTechnology Development | Jane Doe | Jan 25
▦ Create first draft of requirements section for Big Utility Client proposal.
  ESC Misc tasks and checkpoints | Jane Doe | Jan 26
▦ Create first draft of requirements section for Big Utility Client proposal.

ACTION ORIENTED SOCIAL COLLABORATION SYSTEM

PRIORITY CLAIM

This application claims priority to U.S. Provisional Patent Application Nos. 61/702,216, filed Sep. 17, 2012, and 61/768,146, filed Feb. 22, 2013, each of which are incorporated herein by reference.

TECHNICAL FIELD

This application relates to electronic collaboration tools and applications. In particular, this application relates to embedding collaborative social networking components into electronic client applications.

BACKGROUND

Client applications, such as those used to perform management, consulting, collaborative, etc. services, often use a complex set of resources and personnel to serve a client's needs. The resources and personnel needed to meet a client's needs may vary throughout a particular business process. With today's business and technology requirements, creating a cost-effective collaboration infrastructure that effectively monitor's a project team's progress, collectively and individually, and that identifies and leverages a business' best personnel and resources for a given project can be challenging. There also exists a need for an improved user interface to more effectively and efficiently capture action and event data generated by users and especially those interacting with other parts of a computer system.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 3 shows a collaborative dashboard page provided by an action oriented collaboration system, such as the system shown in FIG. 1.

FIG. 5 shows another example of an action panel provided through the dashboard shown in FIG. 3.

FIG. 7 shows a document in which the maturity stage of the document is embedded within the document.

FIG. 8 shows the documents panel of the dashboard shown in FIG. 3.

FIG. 9 shows the activity feed of the dashboard shown in FIG. 3.

FIG. 10 shows the task overview panel of the dashboard shown in FIG. 3.

FIG. 11 shows a custom project launch panel.

FIG. 13 shows an example of the content page of the custom project workspace shown in FIG. 12.

DETAILED DESCRIPTION

Figure 1:
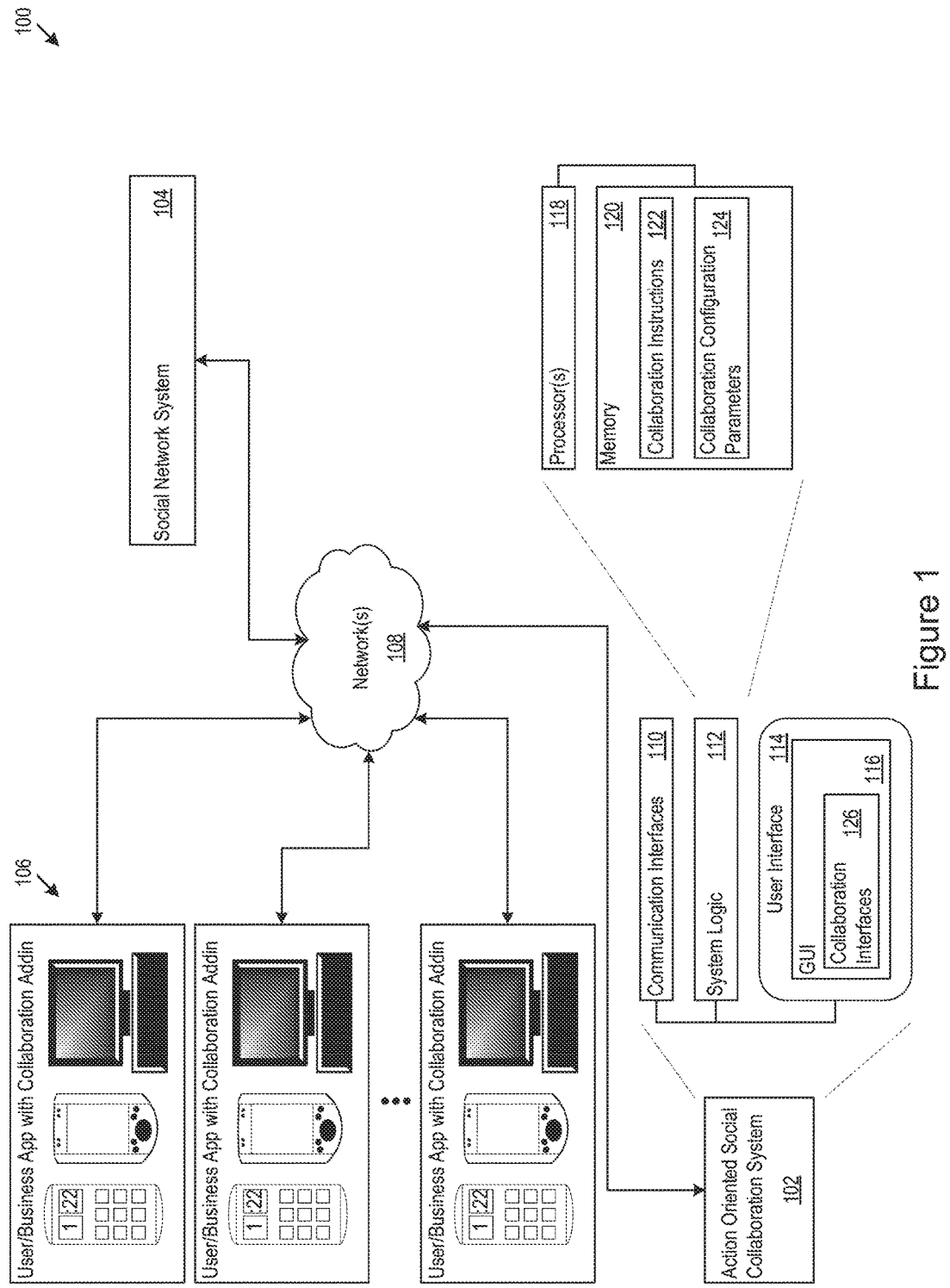
FIG. 1 shows an example of a social collaboration architecture for facilitating collaboration using a social network platform.

FIG. 1 shows an example of a social collaboration architecture 100 ("architecture 100") for facilitating collaboration using a social network platform. The architecture 100 includes an action oriented social collaboration system 102 ("collaboration system 102"), a social network system 104, and user portals 106, each of which is configured to communicate over any number or variety of communications network(s) 108. The user portals 106 may correspond to members of a project team or collaboration group using client applications, or other computer software applications, to perform a project or other activity. The client applications executed by the user portals 106 may be augmented via software plugins that provide social collaboration functionality for the software applications. As examples, the client applications may be an office suite application, e.g., Microsoft Office®, WordPerfect Office®, etc., or any other computer software applications. Alternatively or additionally, the user portals 106 may execute software natively written to provide the social collaboration functionality.

The user portals 106 may take many different forms. As examples, the user portals 106 may be smart phones, laptop computers, personal data assistants, pocket computers, tablet computers, portable email devices, or processes executed in memory by a processor. The user portals 106 may be found in virtually any context, including the home, business, public spaces, or automobile.

The collaboration system 102 may facilitate action oriented status updates provided to the social networking system 104. The status updates may be contextual, automated, pre-defined. The collaboration system 102 enhances the collaborative activities by making it easier to both form and post the status messages in the relevant groups and forums. The collaboration system 102 also allows contextual and relevant feeds to be available to the user portals 106.

The collaboration system 102 may include communication interfaces 110 that connect the collaboration system 102 to the networks 108, system logic 112, and a user interface 114. The user interface 114 may display a graphical user interface 116. The user interface 114 facilitates setup, configuration, and monitoring of the collaboration system 102.

The system logic 112 implements in hardware, software, or both, any of the processing, user interfaces, reports, and other aspects of the system shown or described below or in the Figures. As one example, the system logic 112 may include one or more processors 118 and program and data memories 120. The program and data memories 120 hold, for example, collaboration instructions 122. The data and program memories 120 may also hold collaboration configuration parameters 124 that guide the operation of the collaboration system 112.

The processors 118 execute the collaboration instructions 122, and the configuration parameters 124 may inform the processors 118 as to how to handle the specific aspects of the collaboration processing described below and shown in the drawings. As a result, the processors 118 and collaboration instructions 122 implement the collaboration techniques described below and shown in the Figures. The collaboration system 102 may accept input from the user interface 114 to change, view, add, or delete any of the configuration parameters 124 at any time.

The social networking system 104 may be Jive®, Tibbr®, Moxie®, Chatter®, Yammer®, Newsgator® or other social network/micro-blogging systems. The social networking system 104 generates updates based on the received event information and pushes the updates back to the collaboration system 102. When the collaboration system 102 receives updates, it populates collaboration interfaces 126. While the collaboration interfaces 126 may appear on the GUI 116, the collaboration system 102 may also push the collaboration interfaces 126 (or updates thereto) to the user portals 106 over the networks 108. The collaboration system 102 may populate multiple collaboration interfaces, each corresponding to a different user or user portal 106. For example, if a user completes a task or edits a document, the collaboration system 102 may send updates to the collaboration interfaces of other users that are part of the user's project team or collaboration group. In so doing, the system 102 provides an improved user interface for users that organizes and presents information from multiple sources and databases into a single, efficient interface. In this manner the system 102, makes efficient use of, and decreases the demand on, available computing resources, as well as decreases the computing time—and thus, again, decreases the computing resources—required to gather and provide a user with the relevant information.

The collaboration system 102 may communicate with social networking system 104 through a communications network 108. The communications network 108 may be any private or public communications network or combination of networks. The communications network 108 connects devices, such as the user portals 106, servers, systems, databases, or other network enabled devices, to other such devices, and thereby supports data communication between the connected devices. The communications network 108 may generally be enabled to employ any form of computer-readable media for communicating information from one computing device to another. The communications network 108 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 108 may execute any communication method by which information may travel between computing devices.

The user portals 106 may access the collaboration system 102 via the communications network 110, for example, using a browser application. A browser based implementation allows system features to be accessible regardless of the underlying platform of the user portals 106. For example, the user portals 106 may each be a desktop, laptop, handheld computer, cell phone, mobile messaging device, network enabled television, digital video recorder, automobile, or other network enabled user portal, which may use a variety of hardware and/or software packages. The user portals 106 may also connect to the collaboration system 102 and social network system 104 using a stand-alone application which may be platform-dependent or platform-independent.

The collaboration system 102 may be implemented in many different ways. For example, although some features may be shown or described as stored in computer-readable memories (e.g., as logic implemented as computer-executable instructions or as data structures in memory), all or part of the collaboration system 102 and its logic and data structures may be stored on, distributed across, or read from other machine-readable media. The media may include hard disks, floppy disks, CD-ROMs, a signal, such as a signal received from a network or received over multiple packets communicated across the network.

The collaboration system 102 may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the collaboration system 102 may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that performs the collaboration processing described in this document and shown in the Figures.

The system 102 extends the commercial capability of the enterprise that facilitates collaboration. The system 102 provides a set of tools to connect social channels with the actions people implicitly and explicitly complete as part of a business project and in a team environment. The system 102 provides an environment in which a user does not have to consciously go to a social channel and update what they are working on. Instead the system 102 lowers the barrier of entry of social collaboration platforms by making these updates and actions part of their daily work. This system 102 makes this possible through widgets on the platform that help automate the creation and managing of common tasks to the extension of the platform inside desktop and web applications the user is already engrained in.

Features and operations of the action oriented social collaboration system 102 communicate with widgets and webparts (e.g., ASP.NET server control app) that may be integrated into workspaces to reduce the barrier of entry in the configuration of the social networking environment. The system 102 provides tools that enhance the action-oriented functionality of commercial social collaboration platforms. An action-oriented social collaboration interface provided by the action oriented social collaboration system 102 may include a dashboard for tracking work streams and work products of that workgroup and related workgroups, one click access for performing common work activities on the platform, a viewport for monitoring the social discussion activity related to the groups work streams and work.

The widgets and webparts extend business applications to provide fine-grained interaction with the applications. For example, an extended Microsoft Office® application may include activity feeds populated with activities or tasks performed by other members of a project team. The system 102 may facilitate the tracking of changes to specific sections of a document within social networking platform discussions. The system 102 may facilitate assignment of tasks related to work products from within the applications.

An information worker may not stay within a single tool for the whole day but instead may work across a number of different applications and sites. The system 102 creates a social connection in the various applications that allow a user to continue their regular working process but still able to share their knowledge on social communities as they change between applications. For instance, in Microsoft Office® products the system 102 may provide a social feed about the document the user is working on but also have access to feeds from other sources so the user can bring in references to work with.

The system 102 also facilitates team-based work and activities by, for example, tracking activity, comments, and tasks related to a file. While working within their desktop application, the system 102 allows a user to connect with the social network and manage their activities and tasks. Putting this information in a social channel allows users to view the information wherever they are, such as in the browser, in a document, or on their mobile device, thus providing increased freedom of information across the company.

Figure 2:
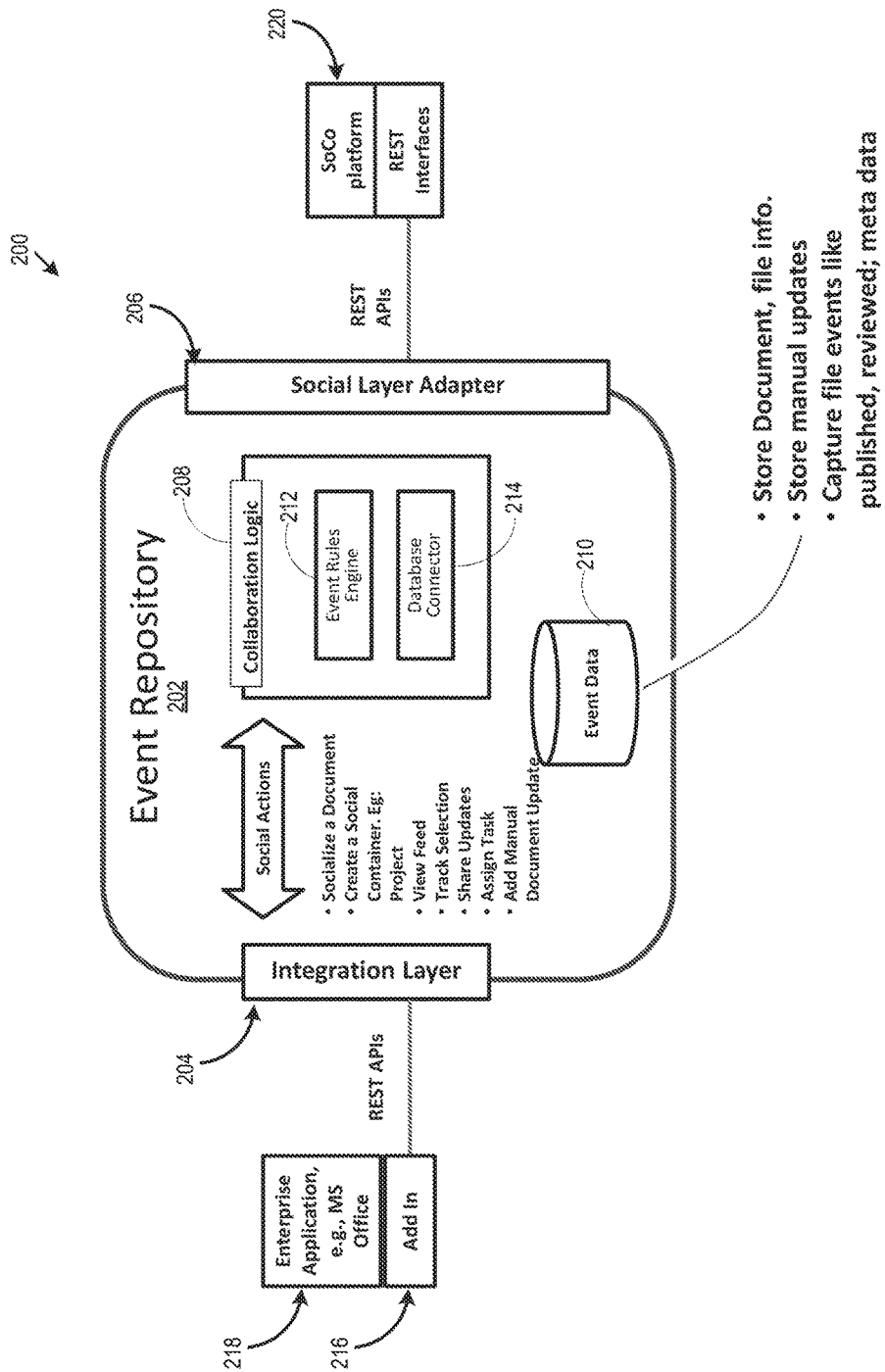
FIG. 2 shows another example of an architecture including an event repository.

FIG. 2 shows another example of an architecture 200 including an event repository 202. The event repository 202 includes an integration layer 204, a social layer adapter 206, collaboration logic 208 and an event data database 210. The collaboration logic 208 includes an event rules engine 212 and a database connector 214. Each of the components of the event repository 202 may be stored in a memory, such as the memory 120 shown in FIG. 1.

The integration layer 204 facilitates communication between the event repository 202 and a plugin 216, or widget, added onto an enterprise application 218, such as a Microsoft Office® application. As social actions are taken in the enterprise application 218, the integration layer receives notification of those actions. Such social actions may include, for example, socializing a document, creating new project, viewing an activity feed, tracking a selection within a document, sharing updates, assigning tasks, or adding a manual document update.

The social layer adapter 206 facilitates communication between the event repository 202 and one or more social collaboration platforms 220, such as Chatter®, Jive®, or other like social collaboration platforms. For example, the social layer adapter 206 may translate event or activity information received from the event repository 202 into information usable by the social networking platforms 220. The social networking system platforms 220 may then publish the event or activity information to activity feeds embedded into enterprise applications used by members of a project team, or to activity feeds embedded into a social collaboration workspace dashboard.

The event rules engine 212 analyzes real time data from social feeds in the social network platform and suggests the appropriate for posting of messages to different activity feeds of groups or individuals as a user takes social actions. For example, if a user assigns a task within a document to another user, the event rules engine 212 determines the appropriate activity feeds to which to post the new task. The event rules engine 212 also categorizes the content according to its importance. The database connector 214 issues requisite calls to the database 210. The database 210 may store relevant documents, user profiles, project templates, and other data and files relevant to social collaboration. The database 210 may store manual status updates, which are discussed in more detail below. The database 210 may capture and store document events, such as when a document is published, reviewed, etc., and also collects metadata.

The database 210 may store tag vocabulary related to skills, projects, interests, etc. The database 210 may also store behavioral data and log data of the users of the system. The event repository 202 may analyze, based on the data stored in the database 210, patterns of collaboration in order to extend the understanding of collective behavior. The event rules engine 212 and database connector 214 may be implemented in software as a set of instructions stored in the memory 120 of the collaboration system 102.

FIG. 3 shows a collaborative dashboard page 300 provided by an action oriented collaboration system, such as the system 102. The dashboard 300 may be a web-page hosted on a server accessible by users via the communications network(s) 108. The dashboard 300 includes an action panel 302 that allows the user to instruct the collaborative system to take certain actions, such as announcing an accomplishment, providing meeting notes, creating a new project, starting a discussion, creating a dossier about a client or vender, or creating a new document. The dashboard 300 includes a custom project launch panel 304 that allows a user to create a new sales opportunity.

The dashboard 300 includes an embedded activity feed 306 that posts events pulled from the social networking platform, e.g., Jive®, Chatter®, etc. The events posted to an activity feed may be filtered based on the particular project team to which a user belongs, e.g., only showing the activity of member of that user's project team(s).

The dashboard 300 includes a documents panel 308 that provides a sortable list 310 of documents relevant to the project in which the project team is engaged, and also provides a status of the document, such as whether or not the document has been completed. The page 300 includes a task overview panel 312 that provides the user with a sortable list 314 of tasks, the task category, the status of each task, the task owner, and a brief description of each task. The list 314 may be filtered or sorted by, for example, task category or task owner. The page 300 also includes a panel 316 that allows a user to create an intellectual property project.

Figure 4:
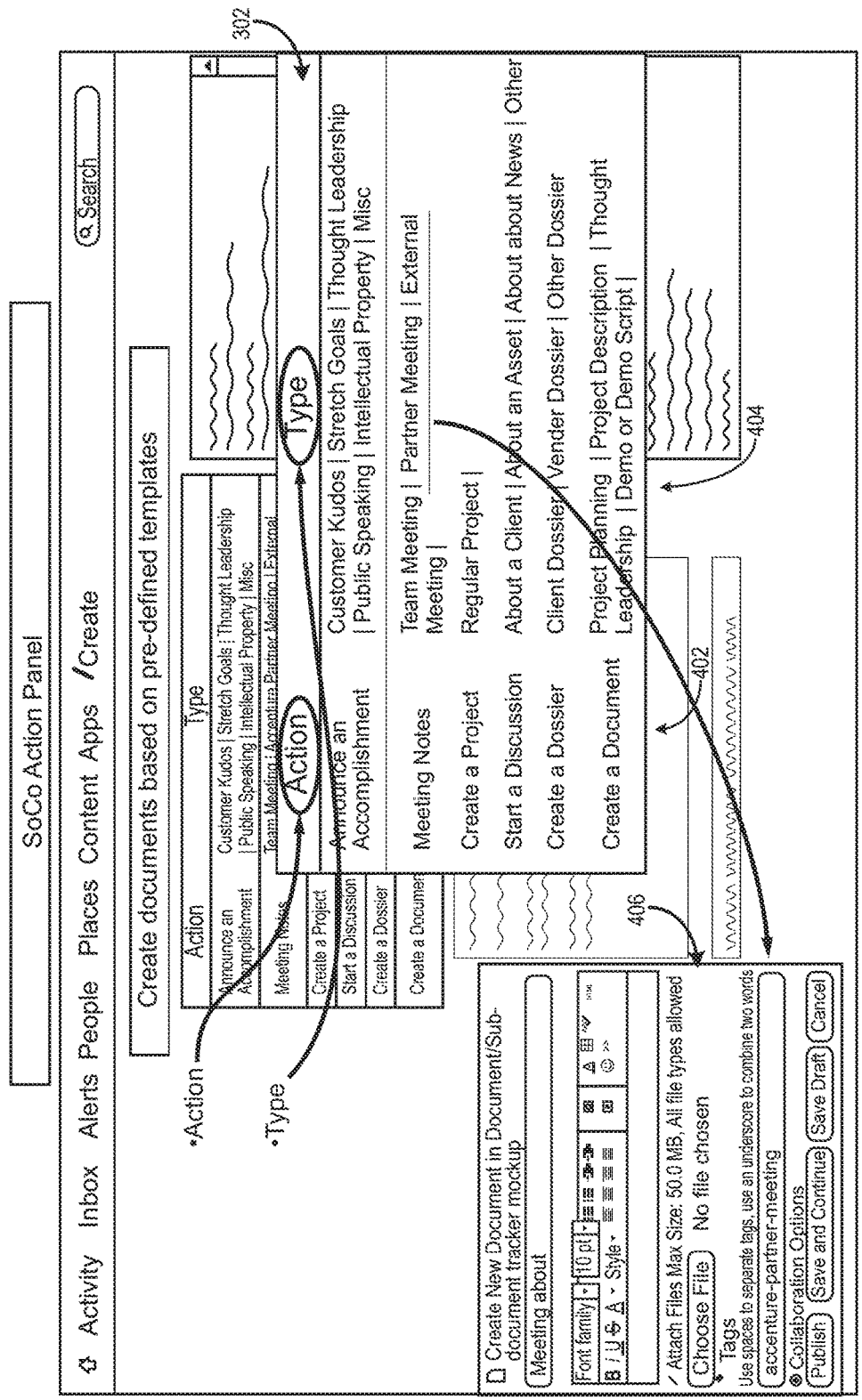
FIG. 4 shows an expanded view of the action panel shown in FIG. 4.

FIG. 4 shows an expanded view of the action panel 302. The action panel 302 identifies in a first column 402 general categories of actions and in a second column 404 more specific types of actions corresponding to each general action category. FIG. 4 also shows a new document panel 406 that the collaboration system may provide to the user if the user selects the Create a Document action 314.

Figure 5:
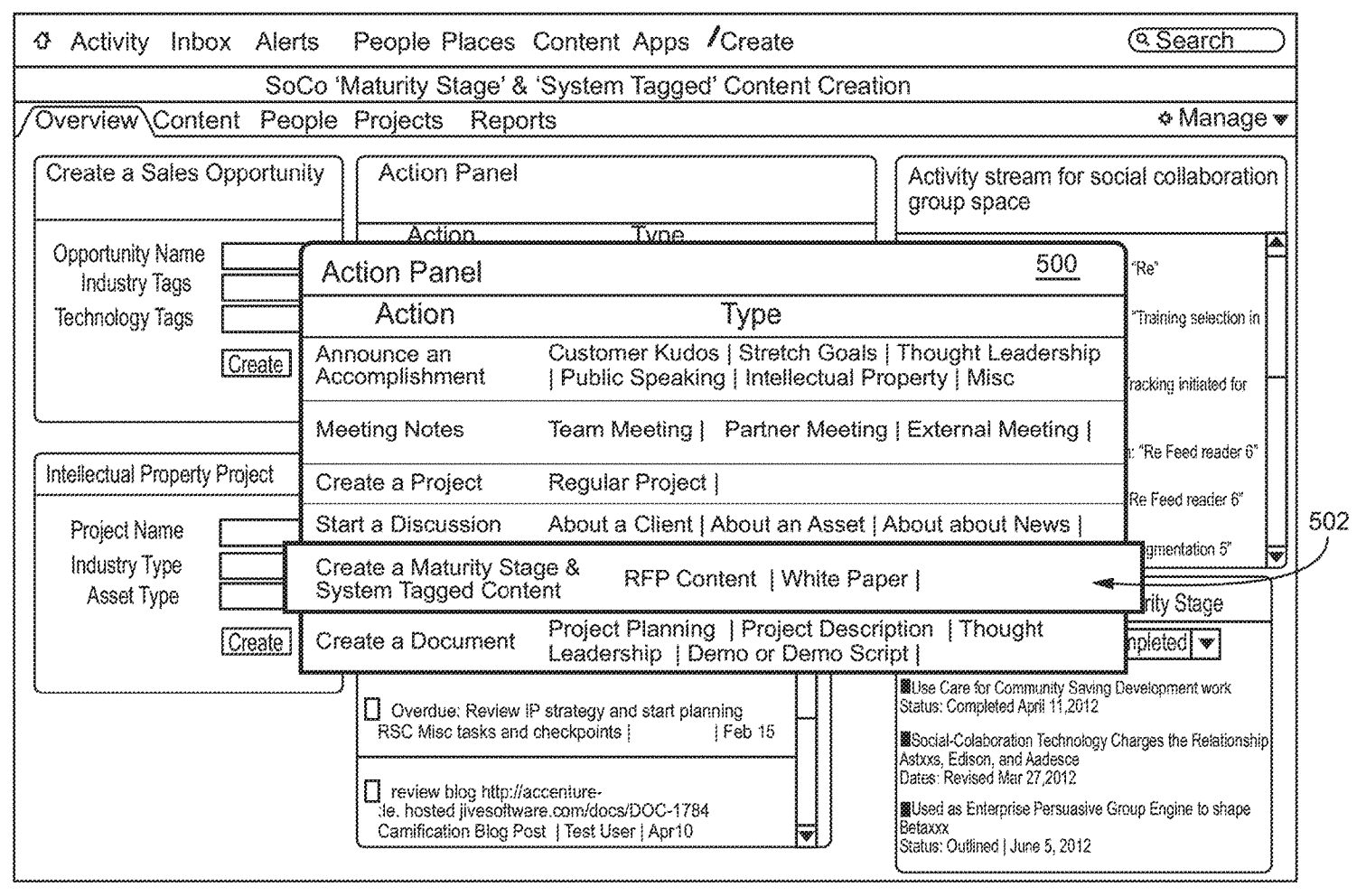
Figure 6:
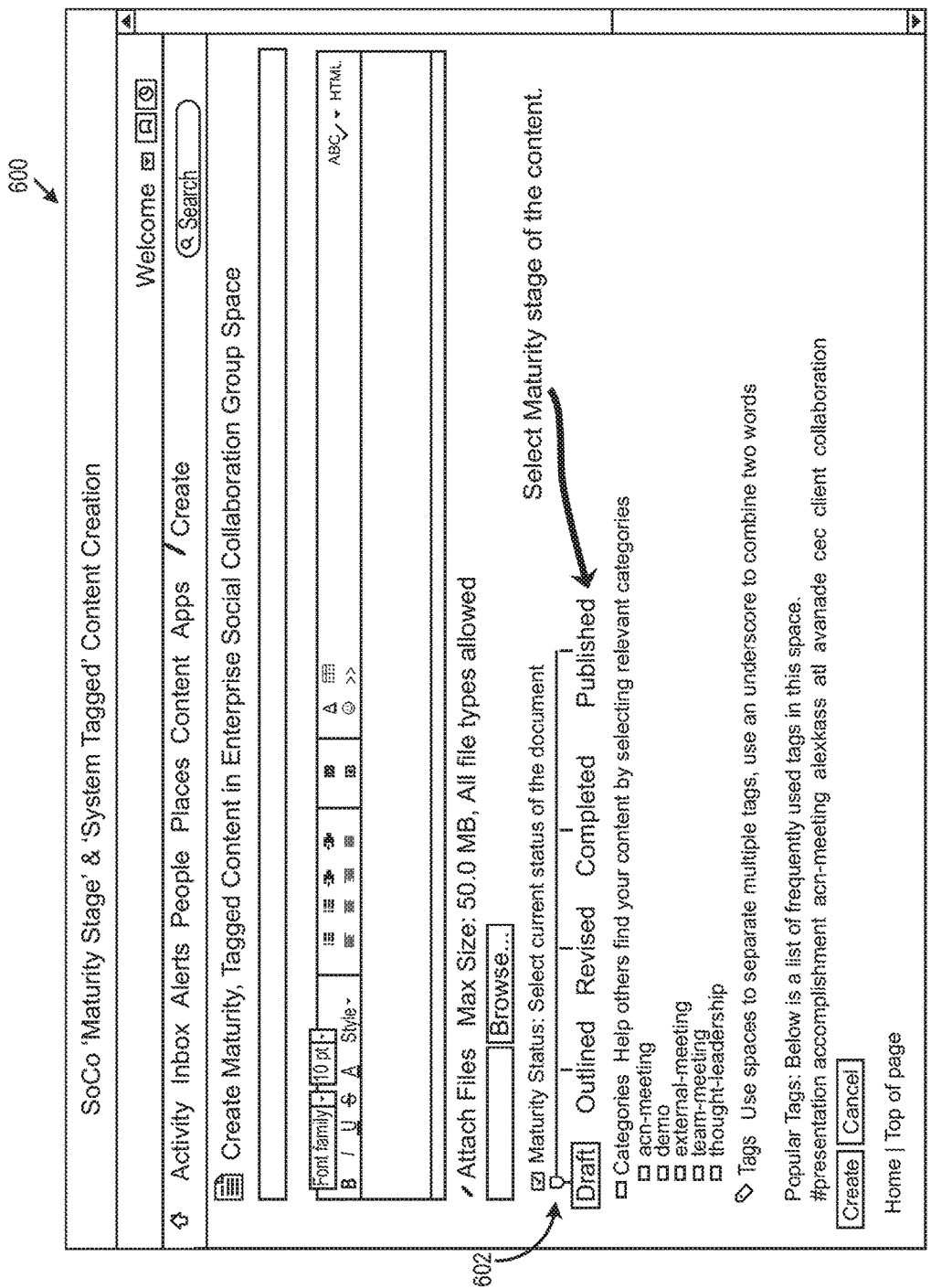
FIG. 6 shows a web page provided by the collaboration system when a user selects the action to create a maturity stage and system tagged content.
Figure 7:
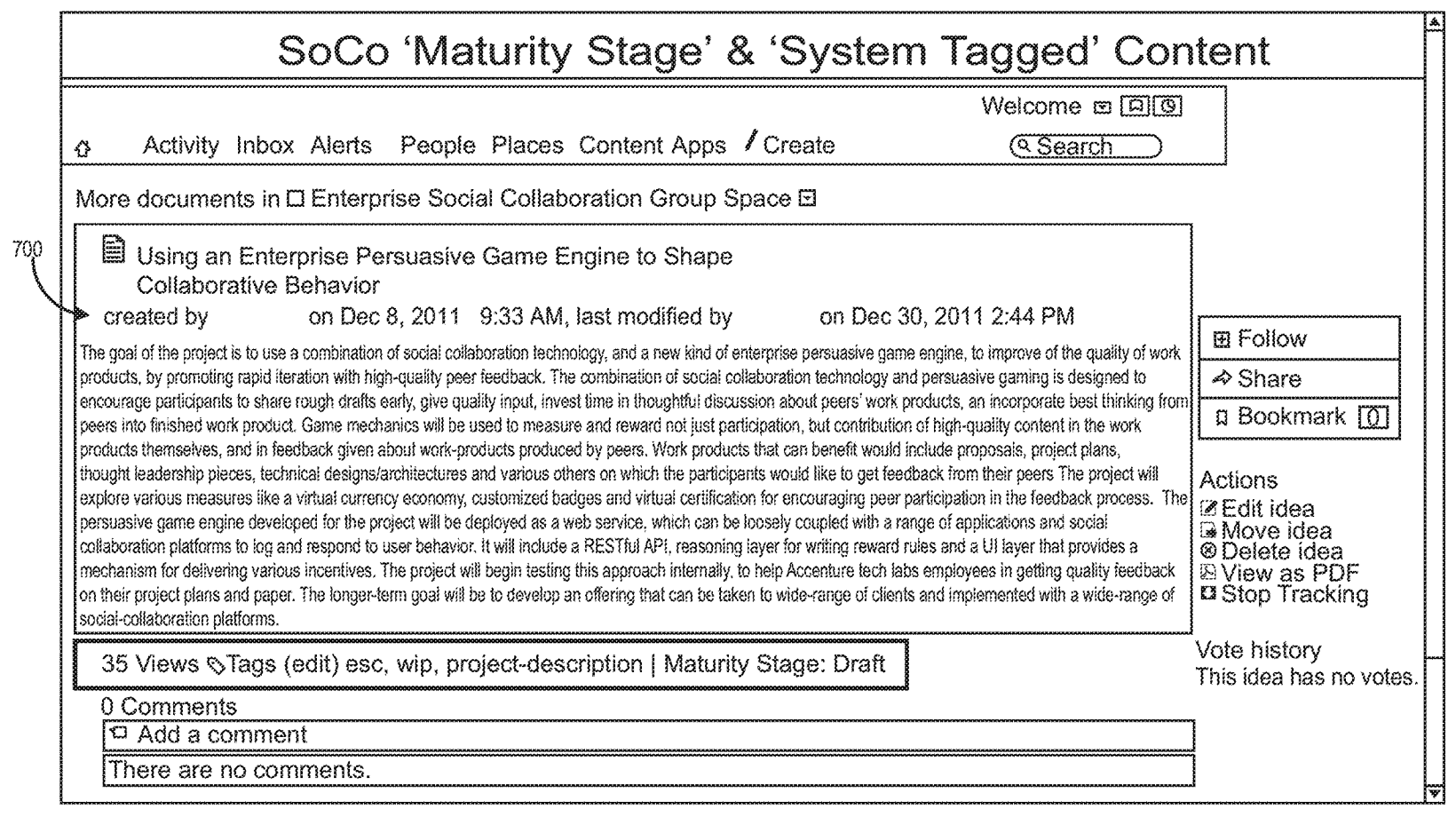
Figure 8:
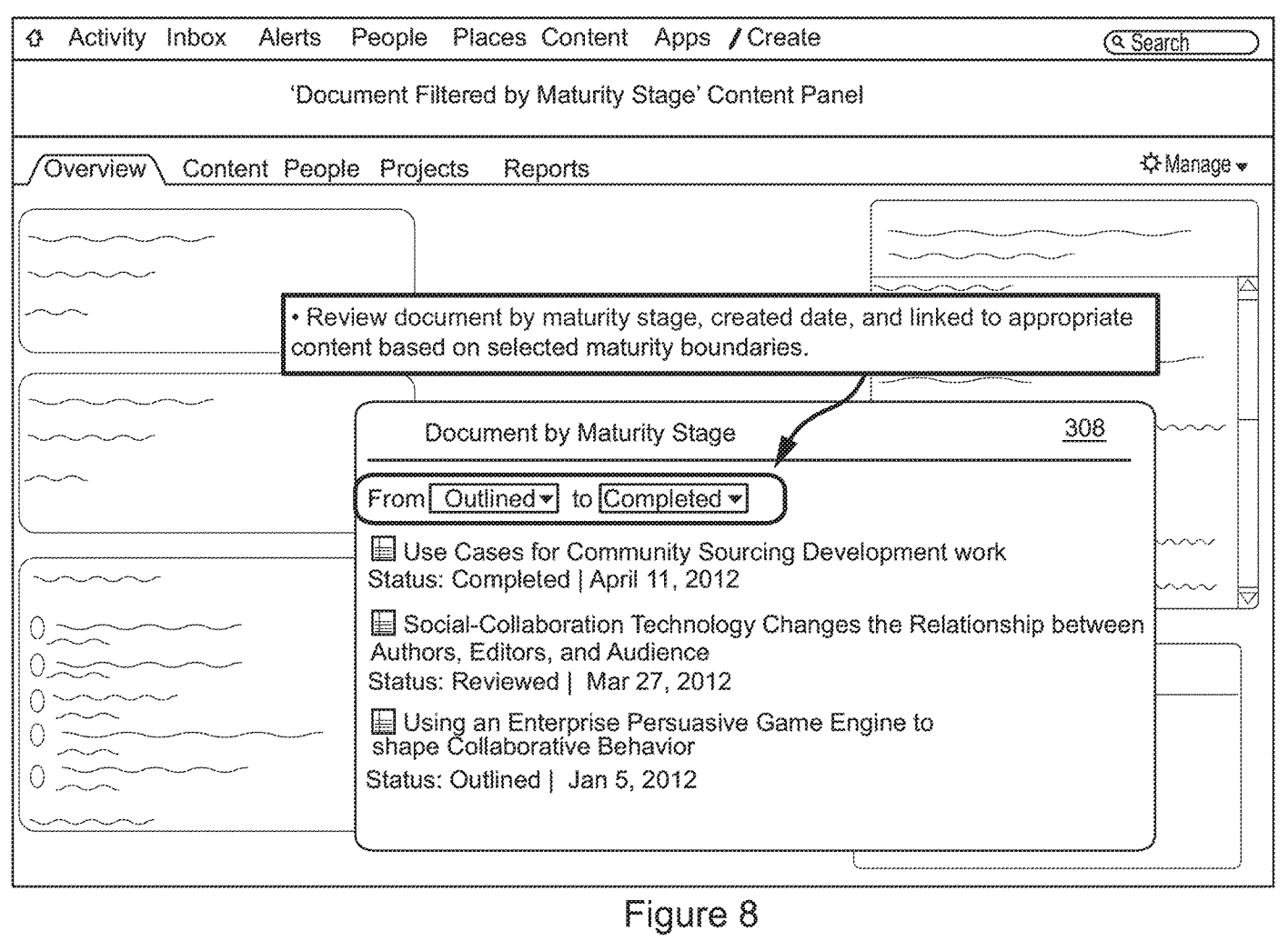

FIG. 5 shows another example of an action panel 500 provided through the dashboard 300. The action panel 500 shown in FIG. 5 includes an action 502 that allows the user to create a maturity stage and system tagged content. FIG. 6 shows a web page 600 provided by the collaboration system when a user selects the action 502 to create a maturity stage and system tagged content. The web page 600 includes a scale 602 through which the user may identified the maturity stage of a document, e.g., draft, outlined, reviewed, completed, published. FIG. 7 shows a document 700 in which the maturity stage of the document is embedded within the document. FIG. 8 shows the documents panel 308 of the dashboard and illustrates that the documents panel may be sorted by maturity stage. The list of documents in the documents panel may include links to each document.

FIG. 9 shows the activity feed 318 of the dashboard. The activity feed 318 may be filtered to provide relevant content while avoiding the clutter of less relevant content. The feed items include links to related projects and documents, which are automatically connected to the appropriate project or document. The feed items may also be automatically filtered based on the project team(s) the user is associated with. Each user may have a different activity stream.

FIG. 10 shows the task overview panel 312 of the dashboard 300. The task overview panel 312 allows the user to review and sort tasks by assignee, due date, and project. The items presented on the task overview panel 312 are automatically linked to the appropriate content.

Figure 11:
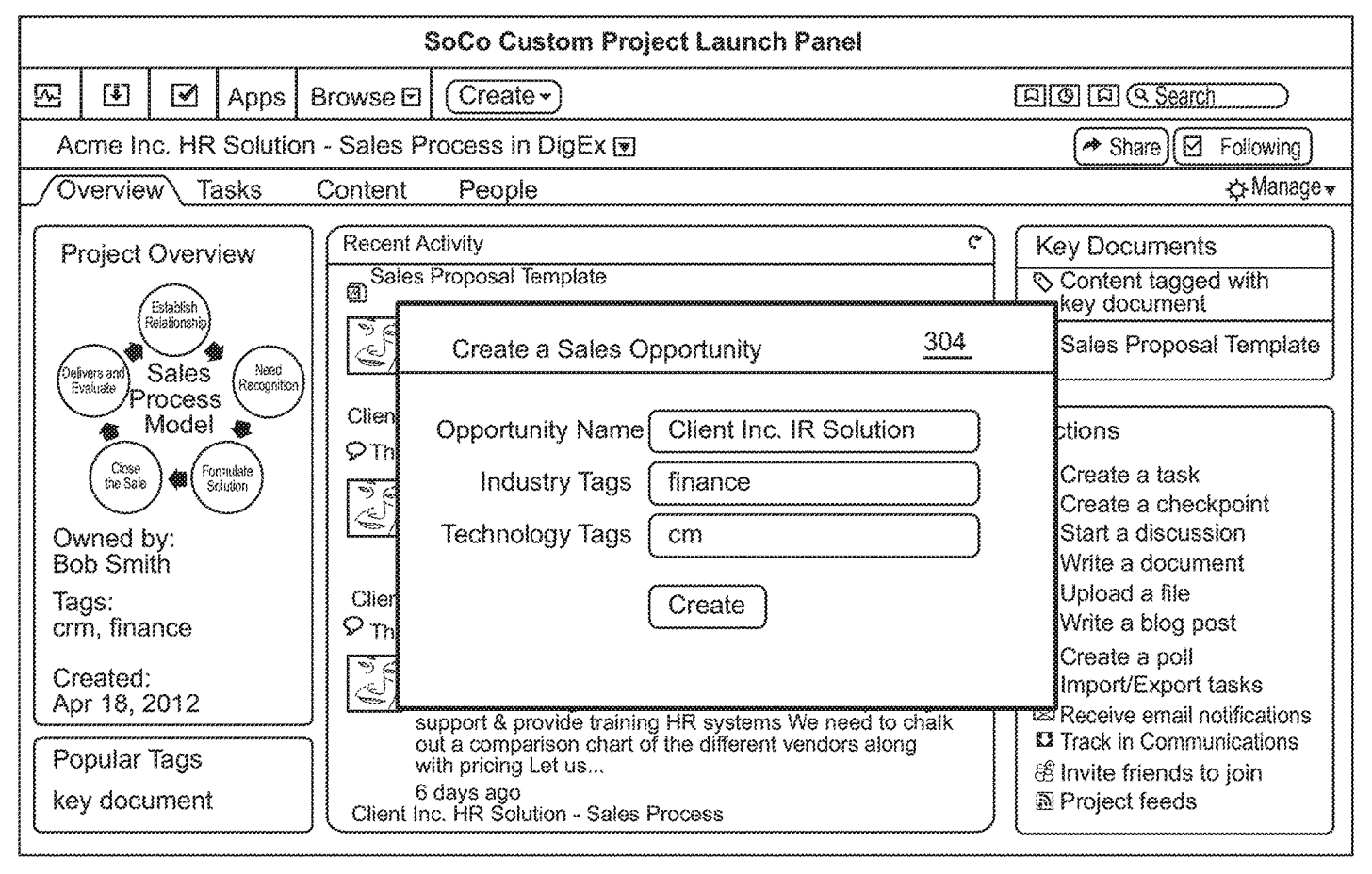

FIG. 11 shows the custom project launch panel 304. The panel 304 includes fields in which the user enters a project opportunity name, relevant industry tags, and technology tags. A user selects the "create" button 1102 to create the custom project. In response to the instruction to create a custom project, the system creates a custom project space based on templates for the work-group's most commonly-used processes (assignment, tracking and automation of workflow tasks based on user roles). The system automatically creates standard discussion threads and document templates as required by the process defined by the user.

Figure 12:
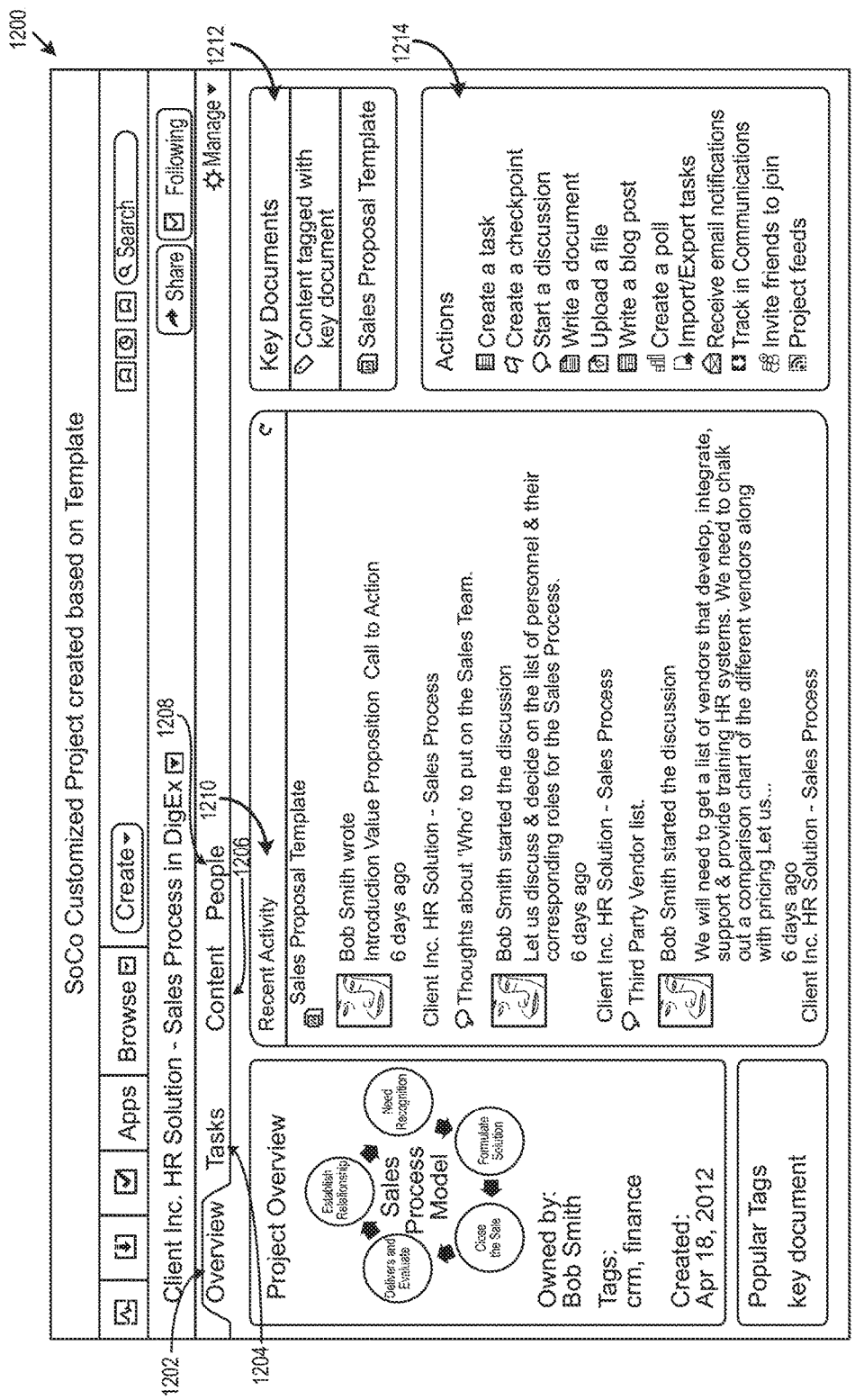
FIG. 12 shows a custom project space created by the collaboration system.

FIG. 12 shows a custom project space 1200 created by the collaboration system after the user provides the instruction via the panel 304. The custom project page 1200 includes an Overview Tab 1202, a Tasks Tab 1204, a Content Tab 1206, and a People Tab 1208. The overview page includes a recent activity feed 1210 that shows reject activity of members of the team assigned to the custom project. The overview page provides links to key documents 1212 and a list of actions 1214 available to a member of the project team.

Figure 13:
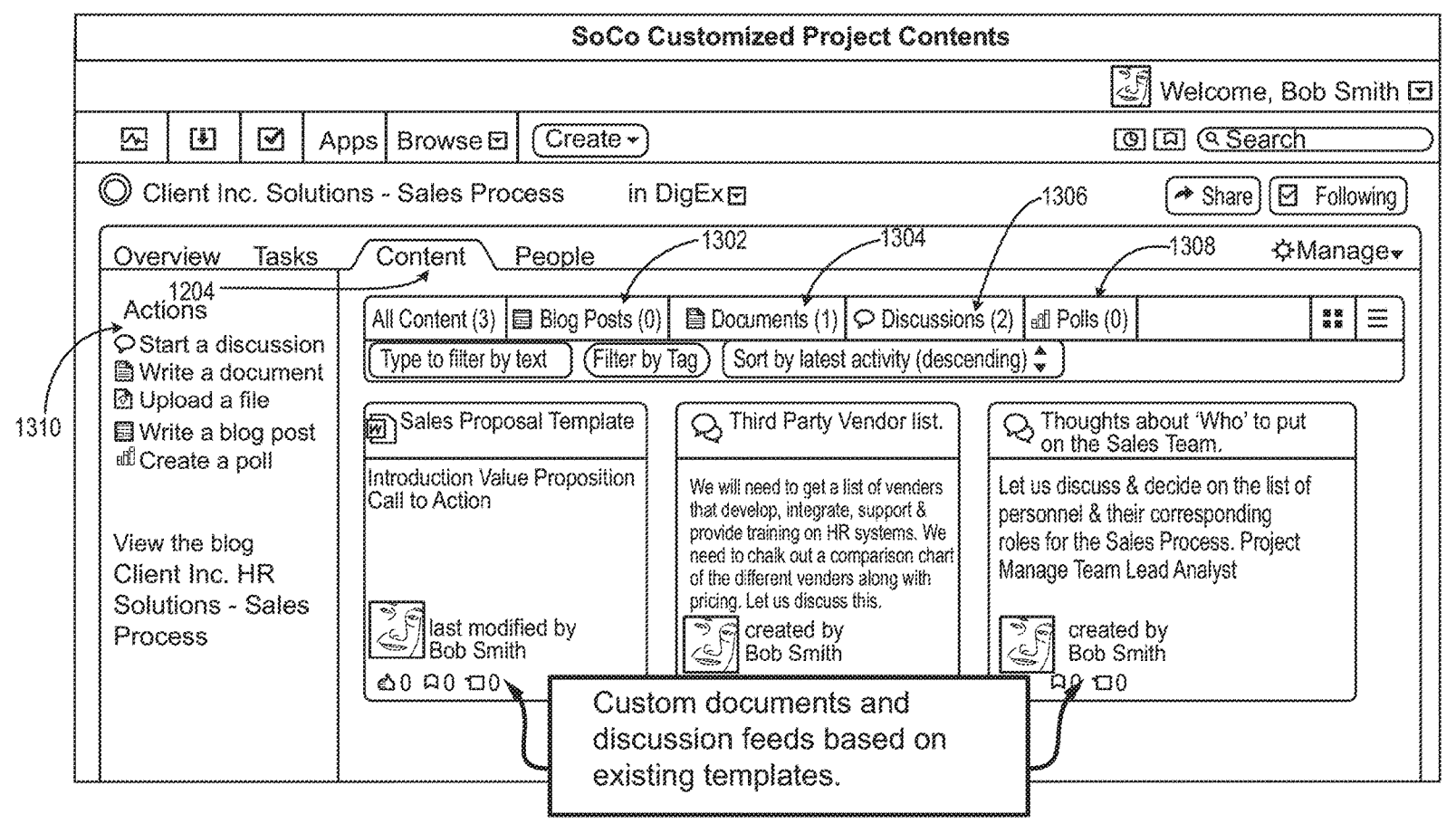

FIG. 13 shows an example of the content page 1206 of the custom project workspace shown in FIG. 13. The content provided through the custom project space may include blogs 1302, documents 1304, discussions 1306, and polls 1308. Each content may be tagged and filtered by the corresponding tags. The content may also be sorted in ascending or descending order based on the latest activity. The content page 1206 also provides action links 1310 that allows the user to create or upload new content.

Figure 14:
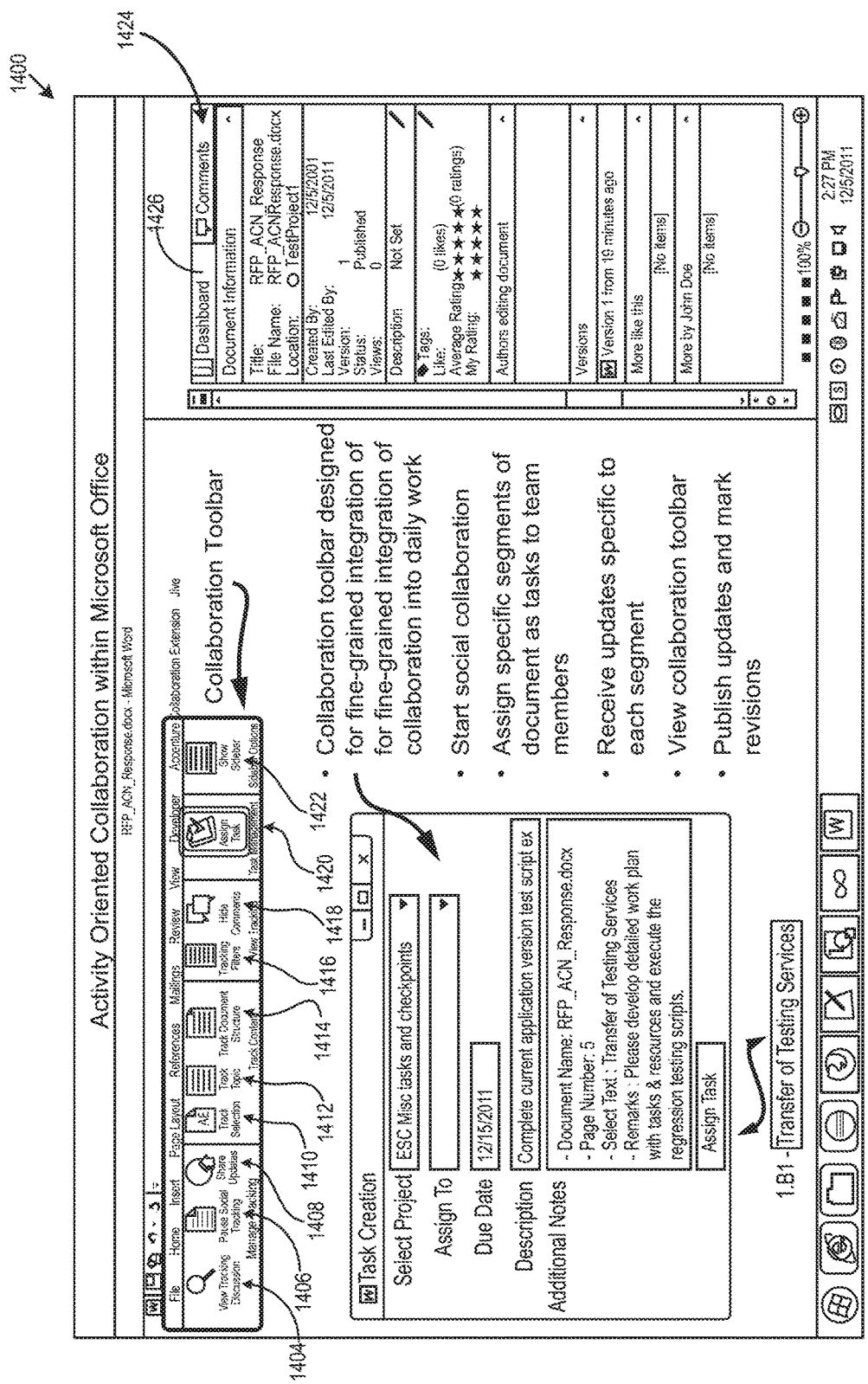
FIG. 14 shows an example of activity oriented collaboration embedded via a plugin within an enterprise application by the collaboration system.

FIG. 14 shows an example of activity oriented collaboration embedded via a plugin within an enterprise application 1400 by the collaboration system. For the sake of explanation, collaboration is shown embedded into applications of the Microsoft Office Suite® (Microsoft Word® in the case of FIG. 14), but it will be understood that collaboration may be embedded into other enterprise applications. The Microsoft Word® application includes a customized and embedded collaboration toolbar 1402 including buttons allowing a user to start tracking a document socially, view a tracking discussion 1404, pause social tracking 1406, which suspends the tracking of changes/modifications for a document on the social collaboration platform, share updates 1408, track selection 1410, track a topic 1412, and track a document structure 1414. The toolbar 1402 also includes a tracking filter 1416, hide comments 1418, assign a task 1420 and show a sidebar button 1422 that allows the user to customize whether to show or hide the sidebar 1424. The sidebar 1424 includes a dashboard 1426 that provide document information.

FIG. 14 shows a task creation window 1426 that is provided when a user selects the assign task button 1420. The task creation window 1426 allows the user to select a project, assign the project to one or more team members, assign a due date for the project, as well as provide a description and additional notes about the project. The user may assign, for example, specific segments of a document as tasks to team members. Once a task is created, the task owner, and other members of the team, may receive updates specific to the segment of the document through an embedded activity feed. The social networking system, e.g., Jive®, Chatter®, etc., provides updates that are populated to the embedded activity feed.

Figure 15:
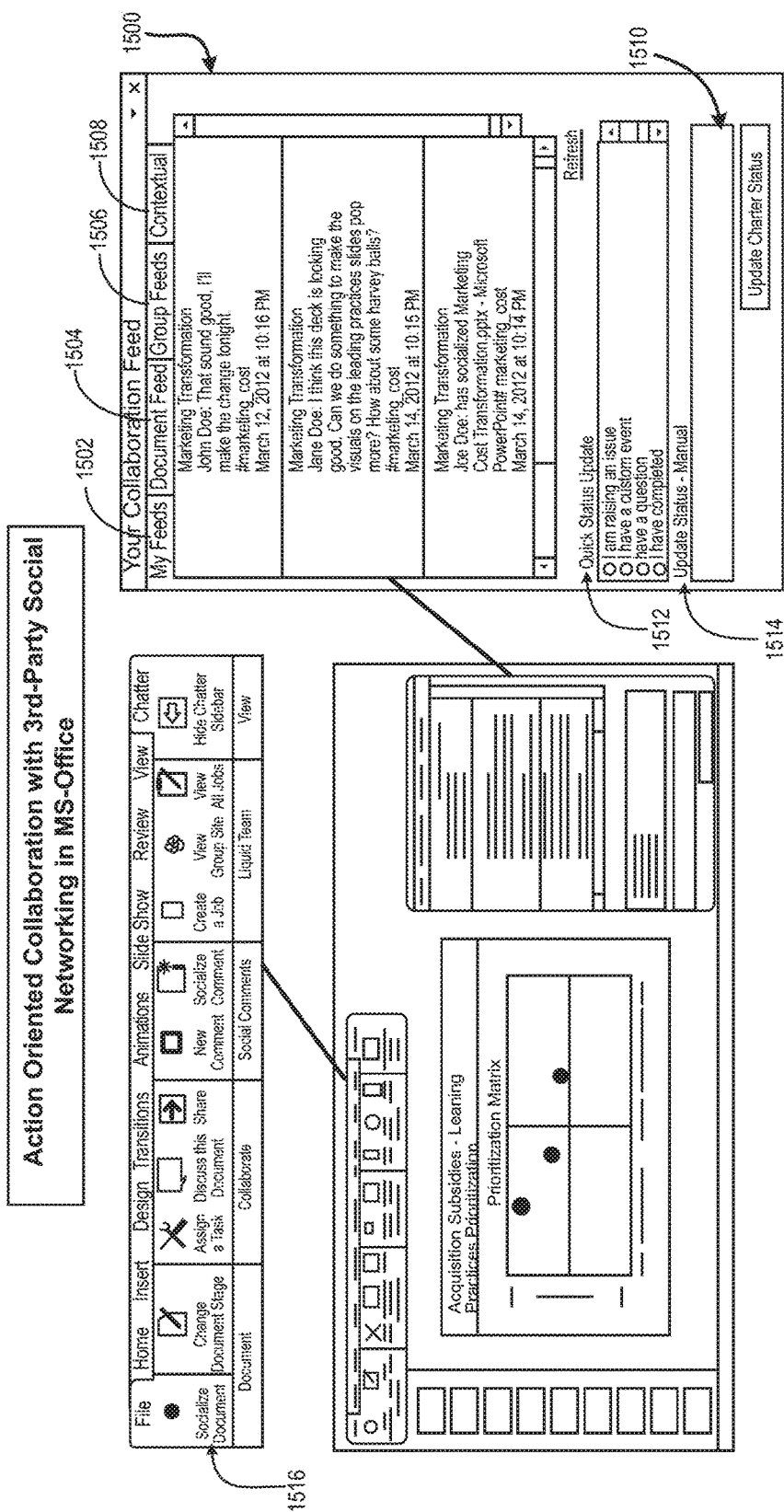
FIG. 15 shows an embedded activity feed that is embedded in an application document.

FIG. 15 shows an embedded activity feed 1500 that is embedded in a Microsoft PowerPoint® document. The activity feed 1500 includes several different feeds, including "My Feeds" 1502 which is a custom feed that user may subscribe to, or may be a feed that aggregates other topic or document specific feeds. The activity feed 1500 includes a "Document Feed" 1504 which includes feeds comments and updates made by group team members about, in this example, the PowerPoint® document. The activity feed 1500 also includes "Group Feeds" 1506 which includes comments made by members of the project group, and Contextual feeds 1608 which provide an activity feed from the social networking platform based on the content of the document being worked on, e.g., keywords, most frequently occurring words, etc. The plugin added to the enterprise application tracks portions of, in this example, the PowerPoint® document and passes those changes to the collaboration system, such as via the communications network(s) discussed with respect to FIG. 1. The collaboration system transmits those changes to the social networking system, which are translated and populated to the appropriate activity feeds of members of the project team.

The activity feed 1500 also includes a update section 1510 including a quick status update section 1512, through which the user can provide a standard free-text update, and a manual status update section 1514 through which the user can provide manual status updates. The plugin, or widget, transmits the updates to the collaboration system, which translates and passes the updates to the social networking system to be published to activity feeds of other project team members.

Figure 16:
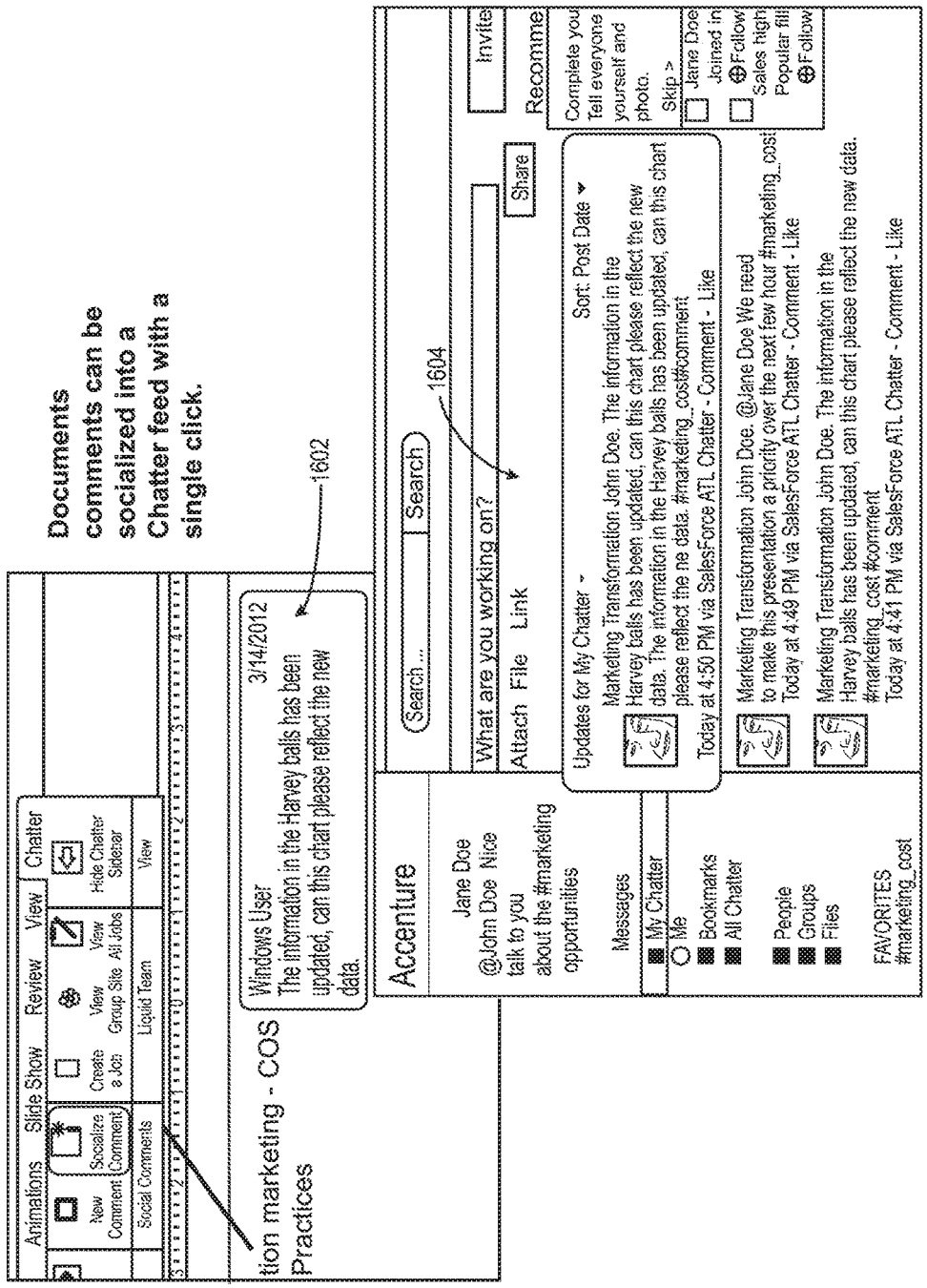
FIG. 16 shows a comment in a document that has been socialized to a social collaboration feed.

The embedded toolbar 1516 may include a "socialize comment" button 1518 which allows a user to socialize a comment or document with a single click. For example, FIG. 16 shows a comment 1602 in a document that has been socialized to a Chatter® feed 1604. It will be understood that other social networking systems, such as Jive®, may be used. The plugin, or widget, added to the software application passes the comment 1602 to the collaboration system, which is translated and passed to the social networking system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An action-oriented social collaboration system, comprising:
   a processor; and
   a memory in communication with the processor, the memory comprising:
   instructions that, when executed, cause the processor to:
   extend a first computer software application to embed a collaboration interface into an interface generated by the first computer software application;
   monitor a first user's interactions with the first computer software application;
   publish the first user's interactions with the first computer software application to a social networking system; and
   publish a second user's interactions with a second computer software application to the social networking system, wherein the social networking system is in communication with the first computer software application and the second computer software application;
communicate with the social networking system to receive updates from the social networking system and populate the collaboration interface, wherein the collaboration interface comprises multiple collaboration interfaces, each collaboration interface corresponding to a different user;
wherein the first computer software application comprises a document handling application and the processor is further programmed to execute instructions comprising:
allowing a user, via the collaboration interface embedded into an interface generated by the document handling application and comprising a customized and embedded collaboration toolbar within the interface of the document handling application, with activation of the toolbar, to start tracking a document socially, view a tracking discussion, pause social tracking, which suspends the tracking of changes for a document on the social networking system, share updates, track selection, track a topic, track a document structure, hide comments, and assign a task; and
translating and transmitting to the social networking system, tracked changes for the document, the updates, the task selection, the tracked topic, the tracked document structure, the assigned task, or a combination thereof;
wherein upon activation of assigning a task by a user, the processor is further programmed to execute instructions comprising:
allowing a user, via a task creation window embedded into the interface generated by the document handling application, to assign a specific segment of a document as a task and publish updates specific to the segment of a document.

2. The system of claim 1, wherein extending the first computer software application comprises embedding a first activity feed within the interface of the computer software application.

3. The system of claim 2, where in the instructions, when executed, further cause the processor to publish the first user's interactions with the first computer software application and the second user's interactions with the second computer software application to the first activity feed.

4. The system of claim 2, wherein the instructions, when executed, further cause the processor to:
extend the second computer software application to embed a second activity feed within the interface of the second computer software application; and
publish the first user's interactions with the first computer software application and the second user's interactions with the second computer software application to the first and second activity feeds.

5. The system of claim 4, wherein the instructions, when executed, further cause the processor to automatically detect actions taken by the first user within the first computer software application and publish the actions taken by the first user to the first activity feed and to the second activity feed.

6. The system of claim 1, wherein extending the first computer software application comprises embedding a customized toolbar within the interface of the first computer software application.

7. A product, comprising:
a non-transitory computer-readable medium comprising instructions that, when executed, cause a computer processor to:
extend a first computer software application to embed a collaboration interface into an interface generated by the first computer software application;
extend a second computer software application to embed a collaboration interface into an interface generated by the second computer software application;
monitor a first user's interactions with the first computer software application;
monitor a second user's interactions with the second computer software application;
publish the first user's interactions with the first computer software application to a social networking system; and
publish a second user's interactions with a second computer software application to the social networking system,
where the social networking system is in communication with the first computer software application and the second computer software application;
communicate with the social networking system to receive updates from the social networking system and populate the collaboration interface, wherein the collaboration interface comprises multiple collaboration interfaces, each collaboration interface corresponding to a different user;
wherein the first computer software application comprises a document handling application and the processor is further programmed to execute instructions comprising:
allowing a user, via the collaboration interface embedded into an interface generated by the document handling application and comprising a customized and embedded collaboration toolbar within the interface of the document handling application, with activation of the toolbar, to start tracking a document socially, view a tracking discussion, pause social tracking, which suspends the tracking of changes for a document on the social networking system, share updates, track selection, track a topic, track a document structure, hide comments, and assign a task; and
translating and transmitting to the social networking system, tracked changes for the document, the updates, the task selection, the tracked topic, the tracked document structure, the assigned task, or a combination thereof;
wherein upon activation of assigning a task by a user, the processor is further programmed to execute instructions comprising:
allowing a user, via a task creation window embedded into the interface generated by the document handling application, to assign a specific segment of a document as a task and publish updates specific to the segment of a document.

8. The product of claim 7, wherein extending the first computer software application comprises embedding a first activity feed within the interface of the computer software application.

9. The product of claim 8, where in the instructions, when executed, further cause the processor to publish the first user's interactions with the first computer software application and the second user's interactions with the second computer software application to the first activity feed.

10. The product of claim 8, wherein the instructions, when executed, further cause the processor to:
embed a second activity feed within the interface of the second computer software application; and
publish the first user's interactions with the first computer software application and the second user's interactions with the second computer software application to the first and second activity feeds.

11. The product of claim 10, wherein the instructions, when executed, further cause the processor to automatically detect actions taken by the first user within the first computer software application and publish the actions taken by the first user to the first activity feed and to the second activity feed.

12. The product of claim 7, wherein extending the first computer software application comprises embedding a customized toolbar within the interface of the first computer software application.

13. The product of claim 7, wherein the instructions, when executed, further cause the processor to detect manual updates provided by the first user in the first computer software application or by the second user in the second computer software application and publish the updates to the first and second activity feeds.

14. A method for action-oriented social collaboration, comprising:
extending, using a computer processor, a first computer software application to embed a collaboration interface into an interface generated by the first computer software application;
extending, using the computer processor, a second computer software application to embed a collaboration interface into an interface generated by the second computer software application;
monitoring, using the computer processor, a first user's interactions with the first computer software application;
monitoring, using the computer processor, a second user's interactions with the second computer software application;
publishing the first user's interactions with the first computer software application to a social networking system;
publishing a second user's interactions with a second computer software application to the social networking system,
wherein the social networking system is in communication with the first computer software application and the second computer software application;
communicate with the social networking system to receive updates from the social networking system and populate the collaboration interface, wherein the collaboration interface comprises multiple collaboration interfaces, each collaboration interface corresponding to a different user;
wherein the first computer software application comprises a document handling application;
allowing a user, via the collaboration interface embedded into an interface generated by the document handling application and comprising a customized and embedded collaboration toolbar within the interface of the document handling application, with activation of the toolbar, to start tracking a document socially, view a tracking discussion, pause social tracking, which suspends the tracking of changes for a document on the social networking system, share updates, track selection, track a topic, track a document structure, hide comments, and assign a task; and
translating and transmitting to the social networking system, tracked changes for the document, the updates, the task selection, the tracked topic, the tracked document structure, the assigned task, or a combination thereof;
upon activation of assigning a task by a user, allowing a user, via a task creation window embedded into the interface generated by the document handling application, to assign a specific segment of a document as a task and publish updates specific to the segment of a document.

15. The method of claim 14, wherein extending the first computer software application comprises embedding a first activity feed within the interface of the computer software application.

16. The method of claim 15, further comprising publishing the first user's interactions with the first computer software application and the second user's interactions with the second computer software application to the first activity feed.

17. The method of claim 15, further comprising:
embedding a second activity feed within the interface of the second computer software application; and
publishing the first user's interactions with the first computer software application and the second user's interactions with the second computer software application to the first and second activity feeds.

18. The method of claim 17, further comprising automatically detecting actions taken by the first user within the first computer software application and publish the actions taken by the first user to the first activity feed and to the second activity feed.

19. The method of claim 14, wherein extending the first computer software application comprises embedding a customized toolbar within the interface of the first computer software application.

20. The method of claim 14, further comprising detecting manual updates provided by the first user in the first computer software application or by the second user in the second computer software application and publish the updates to the first and second activity feeds.

* * * * *